(12) United States Patent
Watanabe et al.

(10) Patent No.: US 9,862,649 B2
(45) Date of Patent: Jan. 9, 2018

(54) RAW SETTER, AND FIRING METHOD OF HONEYCOMB FORMED BODY

(71) Applicant: NGK Insulators, Ltd., Nagoya (JP)

(72) Inventors: Takehiko Watanabe, Nagoya (JP); Akira Nishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/940,460

(22) Filed: Nov. 13, 2015

(65) Prior Publication Data

US 2016/0137558 A1 May 19, 2016

(30) Foreign Application Priority Data

Nov. 18, 2014 (JP) .................. 2014-233974

(51) Int. Cl.
| | |
|---|---|
| *F27D 5/00* | (2006.01) |
| *F27D 3/12* | (2006.01) |
| *C04B 35/64* | (2006.01) |
| *C04B 38/00* | (2006.01) |

(52) U.S. Cl.
CPC .......... *C04B 35/64* (2013.01); *C04B 38/0006* (2013.01); *F27D 3/12* (2013.01); *F27D 5/00* (2013.01); *F27D 5/0012* (2013.01); *F27D 5/0031* (2013.01); *C04B 2235/65* (2013.01)

(58) Field of Classification Search
None
See application file for complete search history.

(56) References Cited

U.S. PATENT DOCUMENTS

| | | | |
|---|---|---|---|
| 4,786,542 A | 11/1988 | Yasuda et al. | |
| 6,705,860 B2* | 3/2004 | Fukushima | ............. C04B 35/64 |
| | | | 428/116 |
| 2002/0042037 A1 | 4/2002 | Fukushima et al. | |
| 2008/0142149 A1 | 6/2008 | Noguchi et al. | |
| 2009/0057963 A1* | 3/2009 | Chan | .................... F27D 3/0022 |
| | | | 264/630 |

(Continued)

FOREIGN PATENT DOCUMENTS

| | | |
|---|---|---|
| EP | 0 234 887 A1 | 9/1987 |
| JP | 2000-274954 A1 | 10/2000 |

(Continued)

OTHER PUBLICATIONS

Extended European Search Report (Application No. 15194603.5) dated Mar. 23, 2016.

(Continued)

*Primary Examiner* — Humera Sheikh
*Assistant Examiner* — Nicholas W Jordan
(74) *Attorney, Agent, or Firm* — Burr & Brown, PLLC

(57) ABSTRACT

A raw setter has a plate shape, is made of the same material as in a honeycomb formed body, and has a chamfered portion in which a circumferential portion of one end face is chamfered in an oblique direction and whose has a tapered cross-sectional shape by reducing a diameter of an end face portion to an outer diameter, a ratio of an area of a flat portion to an end face area is from 10 to 85%, an angle formed between the flat portion and the chambered portion is from 3 to 50°, a flatness of each of the flat portion of the one end face and a flat portion of the other end face is 0.3 mm or less, and a thickness of cell partition walls is 0.1 mm or less.

7 Claims, 5 Drawing Sheets

(56) References Cited

U.S. PATENT DOCUMENTS

| | | |
|---|---|---|
| 2012/0013052 A1 | 1/2012 | Schumann |
| 2013/0049269 A1 | 2/2013 | Uoe |
| 2013/0140747 A1 | 6/2013 | Uoe |

FOREIGN PATENT DOCUMENTS

| | | |
|---|---|---|
| JP | 2002-114579 A1 | 4/2002 |
| JP | 2012-051791 A1 | 3/2012 |
| WO | 2006/035674 A1 | 4/2006 |
| WO | 2010/109120 A1 | 9/2010 |

OTHER PUBLICATIONS

Japanese Office Action (Application No. 2014-233974) dated Mar. 21, 2017 (with English translation).
European Office Action (Application No. 15194603.5) dated Apr. 3, 2017.

\* cited by examiner

RAW SETTER, AND FIRING METHOD OF HONEYCOMB FORMED BODY

The present application is an application based on JP2014-233974 filed on Nov. 18, 2014 with the Japan Patent Office, the entire contents of which are incorporated herein by reference.

BACKGROUND OF THE INVENTION

Field of the Invention

The present invention relates to a raw setter, and a firing method of a honeycomb formed body. More particularly, it relates to a raw setter which is used for firing an unfired honeycomb formed body extruded by using an extruder, in a firing furnace, and a firing method of a honeycomb formed body.

Description of the Related Art

Heretofore, a honeycomb structure made of ceramics has broadly been used in a use application such as a car exhaust gas purifying catalyst carrier, a diesel particulate removing filter, or a heat accumulating body for a burning device. The honeycomb structure made of the ceramics (hereinafter simply referred to as "the honeycomb structure") is manufactured by preparing a forming material (a kneaded material), extruding the material into a desirable honeycomb shape by use of an extruder, followed by raw cutting, drying and finish-cutting, and then subjecting the material through a firing step of firing the material at a high temperature.

In the above firing step, the honeycomb formed body is loaded on a shelf plate in a state where one end face of the honeycomb formed body is directed downward, and the honeycomb formed body and the shelf plate are then loaded into a firing furnace. At this time, to prevent the honeycomb formed body from being adhered to the shelf plate, a firing support plate referred to as "a setter" is interposed between the support plate and the honeycomb formed body. As to this setter, a cut piece of the honeycomb structure firing the honeycomb formed body has been used as the honeycomb formed body firing setter, but when the setter is repeatedly used, cracks are generated. Therefore, a press-molded and fired ceramic raw material referred to as "a pressed setter" is used, and hence, the material can be used repeatedly (e.g., see Patent Document 1). Such a setter is generically referred to as "a firing setter". In the present description, the extruded body prior to the firing is called "the honeycomb formed body", and the fired body is referred to as the honeycomb structure.

The extruded honeycomb formed body carries out a firing shrinkage along a longitudinal direction of cells and a direction orthogonal to the cell longitudinal direction in the firing step. Therefore, when the honeycomb formed body is mounted on the above firing setter and loaded into the firing furnace, a shift occurs between an upper surface of the firing setter and a lower end face of the honeycomb formed body due to the firing shrinkage of the honeycomb formed body, and defects such as deformation and fissures of cell partition walls might be generated in the lower end face of the honeycomb structure which comes in contact with the firing setter. In addition, the lower end face of the honeycomb formed body is stuck on the upper surface of the firing setter, the shift does not evenly occur, and a shape of the lower end face of the honeycomb structure might be curved. When the curving occurs, a round pillar-shaped honeycomb structure has a roundness defect in its end face. In particular, when the honeycomb formed body is fired in which cell partition walls defining a plurality of cells have a small thickness, the above defects are remarkably generated.

Thus, when the honeycomb formed body is fired in which the cell partition walls are thin, a raw setter which is cutting an unfired honeycomb formed body made of the same material as the honeycomb formed body (hereinafter simply referred to as "the raw setter") is used in the firing step. A firing shrinkage difference is not made between the raw setter and the honeycomb formed body of a firing object during the firing, and the raw setter can carry out the firing shrinkage at the same timing and the same ratio as the honeycomb formed body along the cell longitudinal direction and a cross sectional direction orthogonal to the cell longitudinal direction. Consequently, in the firing step, any resistances or restraints are not generated between the honeycomb formed body and the raw setter, and the problem of a shape defect such as a defect of each end face cell partition wall or the roundness defect can be eliminated. Furthermore, it is known that a shape or a surface roughness of the upper surface of the raw setter which comes in contact with the lower end face of the honeycomb formed body is regulated, and hence, an influence on the lower end face of the honeycomb formed body can be alleviated even when a slight shift occurs (e.g., see Patent Document 2).

[Patent Document 1] JP-A-2000-274954
[Patent Document 2] WO2006/035674A1

SUMMARY OF THE INVENTION

Even when a honeycomb formed body is fired by using a raw setter, there occurs a phenomenon that the raw setter is restrained by a shelf plate and the raw setter does not isotropically carry out a firing shrinkage. When the raw setter does not isotropically shrink, deformations or fissures of cell partition walls of a lower end face of the honeycomb formed body occur and a shape of a lower end face of a honeycomb structure is curved in the same manner as in the abovementioned firing setter. In recent years, there has been a demand for the honeycomb structure in which the cell partition walls are thinner, and the above problem has been actualized. Thus, when a contact area between the raw setter and the honeycomb formed body is decreased as much as possible, an influence from the raw setter during the firing shrinkage of the honeycomb formed body can be decreased, and the firing shrinkage can isotropically be carried out. However, when the contact area of the raw setter which comes in contact with the honeycomb formed body is small, a weight of the unfired honeycomb formed body is concentrated on a portion of a small contact area, and an end face of the honeycomb formed body might be crushed and deformed into a concave shape due to its own weight. Therefore, the contact area of the raw setter which comes in contact with the honeycomb formed body requires a certain degree of size.

In addition, it is necessary to alleviate the phenomenon that the raw setter is locally stuck on the shelf plate on which the raw setter is loaded and that the isotropic firing shrinkage of the raw setter is disturbed. However, the surface of the shelf plate on which the raw setter is loaded inevitably has a certain degree of roughness, and hence, the surface of the raw setter on its shelf plate side also requires a countermeasure to alleviate the restraint. When a flatness of the surface of the raw setter on the shelf plate side improves, it can be expected that contact between the raw setter and the shelf plate is uniformized and that the restraint to the firing shrinkage of the raw setter from the shelf plate is alleviated. In addition, when the flatness of the surface of the raw setter which comes in contact with the honeycomb formed body improves, it can be expected that the contact between the raw setter and the honeycomb formed body is uniformized and that the restraint to the firing shrinkage of the honeycomb formed body from the raw setter is alleviated. Thus, the flatness of the contact surface of the raw setter is also limited to a predetermined range, and hence, it is expected that the honeycomb formed body isotropically carries out the firing shrinkage.

Thus, the present invention has been developed in view of the abovementioned conventional situations, and an object thereof is to provide a raw setter which enables a honeycomb formed body to isotropically carry out a firing shrinkage, and a firing method of a honeycomb formed body in which the raw setter is used.

According to the present invention, there are provided a raw setter which achieves the above object, and a firing method of a honeycomb formed body in which the raw setter is used.

[1] A raw setter which is used for firing a honeycomb formed body, comprising a plurality of polygonal cells defined by lattice-shaped cell partition walls, has a plate shape, is made of the same material as the honeycomb formed body, has a chamfered portion in which a circumferential portion of one end face is chamfered in an oblique direction, and has a tapered cross-sectional shape reducing a diameter of the one end face to an outer diameter, wherein an area ratio R of a flat portion excluding the chambered portion from the one end face to a cross section of the raw setter is from 10 to 85%, an angle θ formed between the flat portion and the chambered portion is from 3 to 50°, the other end face has a flat portion parallel to the flat portion of the one end face, a flatness of each of the flat portion of the one end face and the flat portion of the other end face is 0.3 mm or less, a thickness of the cell partition walls is 0.1 mm or less, and a circumferential portion of the raw setter has the same shape as in a circumferential portion of the honeycomb formed body to be mounted.

[2] The raw setter according to the above [1], which further has a chambered portion in which a circumferential portion of the other end face is chamfered in an oblique direction and a has a tapered cross-sectional shape by reducing a diameter of the other end face to an outer diameter.

[3] The raw setter according to the above [1] or [2], wherein the angle θ formed between the flat portion and the chambered portion is from 3 to 45°, and the area ratio R of the flat portion of the one end face to the cross section of the raw setter is from 10 to 70%.

[4] The raw setter according to any one of the above [1] to [3], wherein the area ratio R of the flat portion of the one end face to the cross section of the raw setter is from 15 to 50%.

[5] The raw setter according to any one of the above [1] to [4], wherein the angle θ formed between the flat portion and the chambered portion is from 3 to 15°.

[6] A firing method of a honeycomb formed body in which the honeycomb formed body is fired by using the raw setter according to any one of the above [1] to [5], wherein the honeycomb formed body is loaded in an upright position on the raw setter arranged on a shelf plate, to perform the firing.

[7] The firing method of the honeycomb formed body according to the above [6], wherein the raw setter includes a plurality of same polygonal cells defined by the lattice-shaped cell partition walls as the honeycomb formed body.

[8] The firing method of the honeycomb formed body according to the above [6] or [7], wherein the honeycomb formed body is loaded on the raw setter so that a lattice direction of cell partition walls of the honeycomb formed body does not match a lattice direction of the cell partition walls of the raw setter.

According to a raw setter of the present invention, and a firing method of a honeycomb formed body, the honeycomb formed body can be fired without being influenced by a restraint of a shelf plate or the raw setter.

DETAILED DESCRIPTION OF THE PRESENT INVENTION

Figure 1:
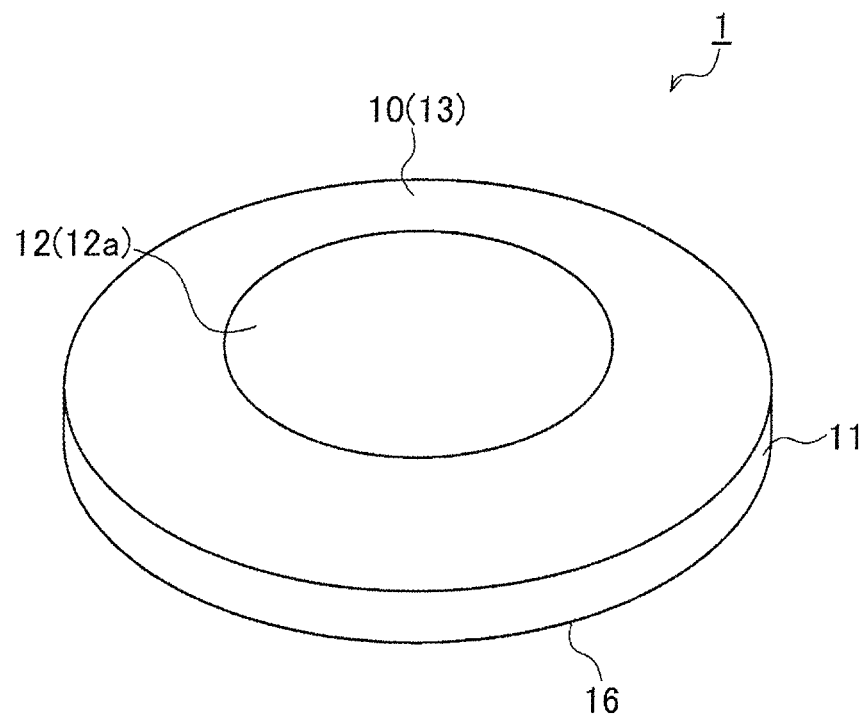
FIG. 1 is a perspective view showing a schematic constitution of a raw setter of the present invention.
Figure 2:
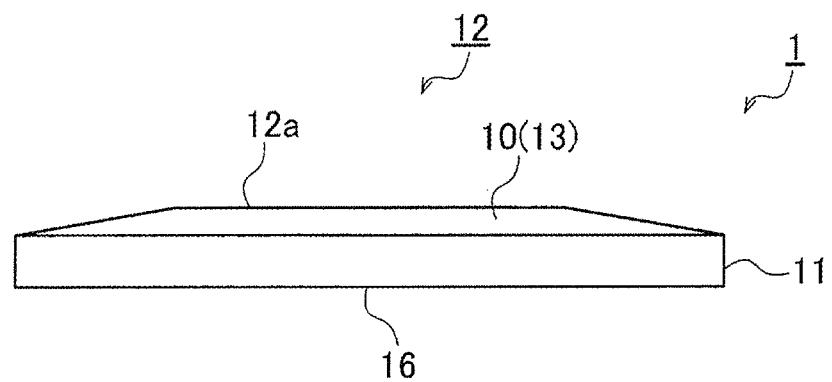
FIG. 2 is a front view showing a constitution of the raw setter of the present invention.
Figure 3:
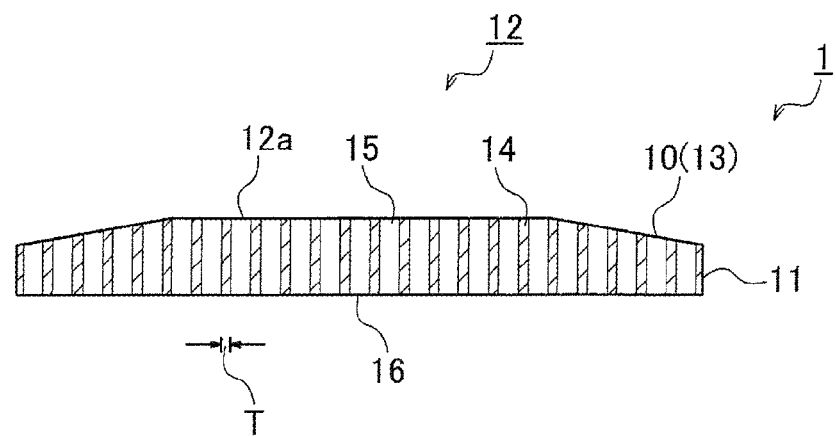
FIG. 3 is a cross-sectional view showing the constitution of the raw setter of the present invention.

Hereinafter, embodiments of a raw setter of the present invention and a firing method of a honeycomb formed body will be described in detail with reference to the drawings. It is to be noted that the raw setter of the present invention and the firing method of the honeycomb formed body are not limited to the following embodiments, and various design changes, modifications, improvements and the like can be added without departing from the gist of the present invention.

As shown in FIG. 1 to FIG. 10, a raw setter 1 of one embodiment of the present invention substantially has a plate shape, and has, in one end face 12, a chamfered portion 10 in which the vicinity of a circumferential side surface 11 (a circumferential portion) of the one end face 12 is chamfered in an oblique direction and a cross section has a tapered shape reducing a diameter of a flat portion 12a to an outer diameter.

The raw setter 1 of the present embodiment is made of the same forming material (not shown) as in a honeycomb formed body 100 to be mounted on the flat portion 12a of the one end face 12, and is constituted of a honeycomb formed body introducing the forming material into an extruder and performing extrusion via a forming die, followed by raw cutting, drying and finish-cutting. The raw setter 1 is not fired yet, and hence, the raw setter can easily be processed.

When the sectional shape is round, an end face of the honeycomb formed body for the raw setter is loaded on a rotary base of a lathe or the like, and a disc surface direction is matched with a rotary shaft direction to rotate the rotary base. In such a state, a cutting tool such as a knife which can cut a part of the forming material is brought close to the vicinity of the circumferential side surface 11 of the one end face 12 of the honeycomb formed body. At this time, a cutting angle of the cutting tool is matched with an angle of an inclined wall surface 13 of the chamfered portion 10 of the one end face 12. In consequence, a part of the honeycomb formed body is cut off by the cutting tool, and the raw setter 1 is completed in which the chamfered portion 10 having the inclined wall surface 13 chamfered in an oblique direction to each of the circumferential side surface 11 and the flat portion 12a is formed on the one end face 12.

The raw setter 1 of the present embodiment includes a plurality of cells 15 defined by rectangular lattice-shaped cell partition walls 14. That is, the flat portion 12a and the chamfered portion 10 of the one end face 12 of the raw setter 1 are formed to communicate with the other end face 16 facing the flat portion 12a in parallel with the flat portion via formed body cells 102 (see FIG. 3). It is to be noted that also in the honeycomb formed body 100 to be mounted on the raw setter 1, a plurality of formed body cells 102 defined by rectangular cell partition walls 101 are formed, and a formed body upper surface 103 of the honeycomb formed body 100 communicates with a formed body bottom surface 104 via the formed body cells 102 (see FIG. 9 or FIG. 10). The circumferential side surface 11 of the raw setter 1 has the same shape as in a circumferential portion of the honeycomb formed body 100 to be mounted on the raw setter. Here, a height of the raw setter 1 is set to be lower than a height of the honeycomb formed body 100 to be mounted. Additionally, in FIGS. 1 and 2 and FIG. 4 to FIG. 7, constitutions of the cell partition walls 14 and the cells 15 are omitted from the drawings for simplification. It is to be noted that examples of the shape of the cells include a triangular shape and a hexagonal shape in addition to the quadrangular shape.

Figure 4:
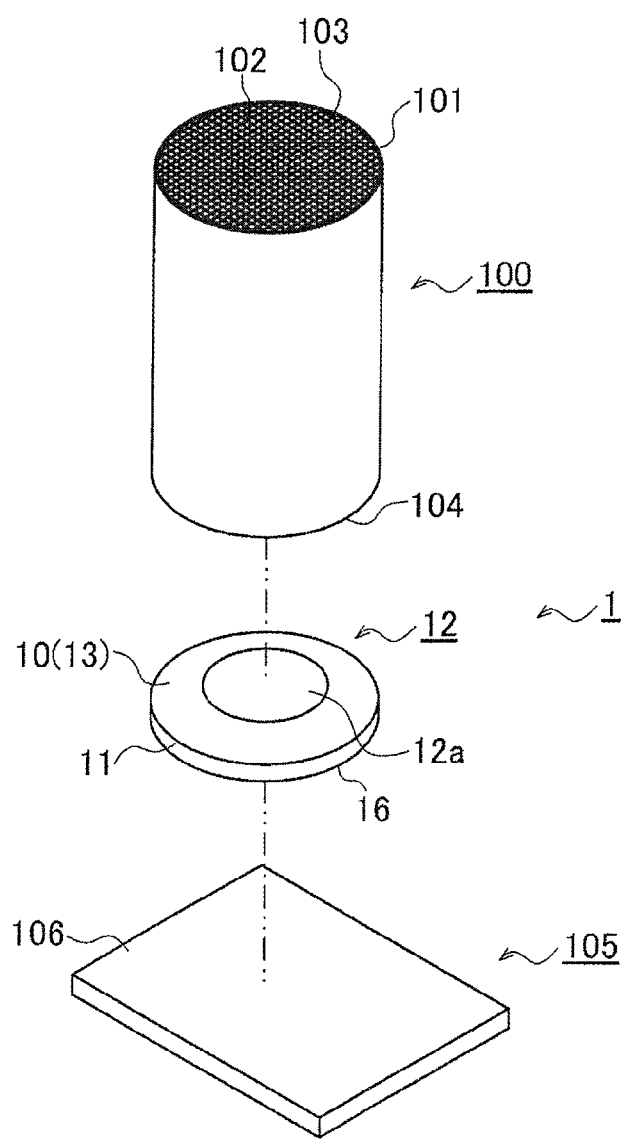
FIG. 4 is an exploded perspective view showing one example of firing in which the raw setter of the present invention is used, in a state where the raw setter is thrown into a firing furnace.

According to the raw setter 1 having the above constitution, the substantially pillar-shaped honeycomb formed body 100 can be mounted in an upright position on the flat portion 12a of the one end face 12 so that the formed body bottom surface 104 is directed downward (see FIG. 4). At this time, an area ratio R (=B/A×100/%) of a flat portion area B of the flat portion 12a to a sectional area A of the raw setter 1 in a direction orthogonal to a longitudinal direction of the formed body cells 102 is set to a range of 10 to 85%, further preferably to a range of 10 to 70%, and especially preferably to a range of 15 to 50% (see FIG. 7).

Figure 6:
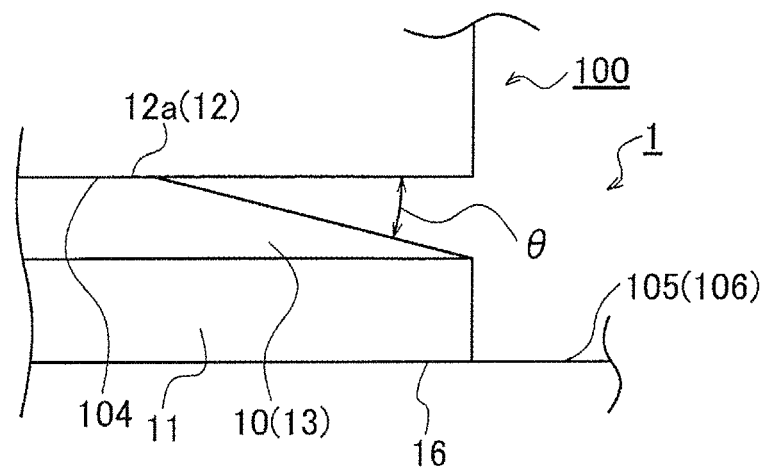
FIG. 6 is an enlarged explanatory view showing a state of contact between the honeycomb formed body and the raw setter.
Figure 7:
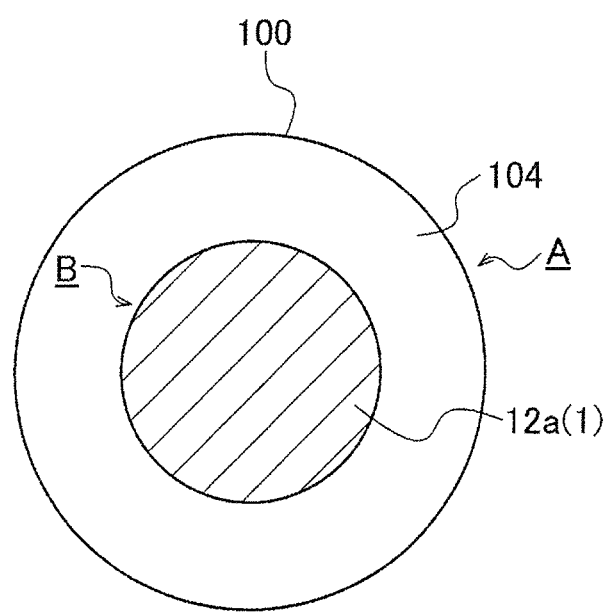
FIG. 7 is an explanatory view schematically showing a contact area of an upper surface portion of the raw setter to a formed body bottom surface of the honeycomb formed body.

Furthermore, an angle θ formed between the flat portion 12a and the inclined wall surface 13 of the chamfered portion 10 is set to a range of 3 to 50°, further preferably to a range of 3 to 45°, and especially preferably to a range of 3 to 15° (see FIG. 6).

The other end face 16 of the raw setter 1 of the present embodiment has a flat portion 16a, the flat portion 12a of the one end face 12 is parallel to the flat portion 16a of the other end face 16, and a flatness of each of the flat portions is set to 0.3 mm or less. That is, concave and convex portions are hardly present in the surface of the raw setter 1 which abuts on the formed body bottom surface 104 and a shelf plate surface 106, and a maximum difference between each concave portion and each convex portion is 0.3 mm or less. In consequence, frictional resistances among the honeycomb formed body 100, the raw setter 1 and a shelf plate 105 decrease.

Furthermore, a thickness T of the rectangular lattice-shaped cell partition walls 14 defining the plurality of cells 15 of the raw setter 1 is set to 0.1 mm or less. In consequence, the raw setter 1 of the present embodiment includes the plurality of cells 15 in which the thickness T is very small, and an open frontal area of each of the cells 15 in the flat portion 12a and the chamfered portion 10 is large. In addition, the thickness T of the cell partition walls 101 of the honeycomb formed body 100 to be mounted on the raw setter 1 is similarly set.

A firing step of the honeycomb formed body 100 is performed by using the raw setter 1 of the above constitution. Specifically, the raw setter 1 of the present embodiment is loaded on the shelf plate surface 106 of the previously prepared shelf plate 105 having a rectangular flat plate shape. The shelf plate 105 is made of a highly heat resistant ceramic material, and does not cause any shrinkage even at a high firing temperature. In addition, the shelf plate surface 106 of the shelf plate 105 on which the raw setter 1 is to be mounted has a larger area than the other end face 16 of the raw setter 1. Therefore, the raw setter 1 mounted on the shelf plate 105 does not project from the shelf plate surface 106 of the shelf plate 105, i.e., the raw setter is loaded in a state where the flat portion 16a of the other end face 16 of the raw setter 1 entirely abuts on the shelf plate surface 106.

Afterward, the extruded and unfired pillar-shaped honeycomb formed body 100 is loaded in the upright sate on the flat portion 12a of the raw setter 1 on the shelf plate 105 so that the formed body bottom surface 104 of the honeycomb formed body 100 is directed downward and so that a center of the formed body bottom surface 104 matches a central position of the flat portion 12a of the raw setter 1. In consequence, the flat portion 12a of the raw setter 1 is covered with the formed body bottom surface 104 of the honeycomb formed body 100, and the raw setter 1 is interposed between the shelf plate 105 and the honeycomb formed body 100 (see FIG. 4 and FIG. 5).

At this time, the honeycomb formed body 100 is loaded to satisfy the conditions that the area ratio R of the flat portion area B of the flat portion 12a to the sectional area A of the raw setter 1 is in a range of 10 to 85% and that the angle θ formed between the flat portion 12a and the inclined wall surface 13 of the chamfered portion 10 is in a range of 3 to 50°. Here, the area ratio R of the flat portion area B of the flat portion 12a is in the above range, and hence, an empty weight of the honeycomb formed body 100 does not have to be supported by one small point or the like of the formed body bottom surface 104, and the weight of the honeycomb formed body 100 can be dispersed to be supported by the whole flat portion 12a. In consequence, the formed body bottom surface 104 is not dented into a concave shape by the empty weight of the honeycomb formed body 100 during the firing.

Figure 5:
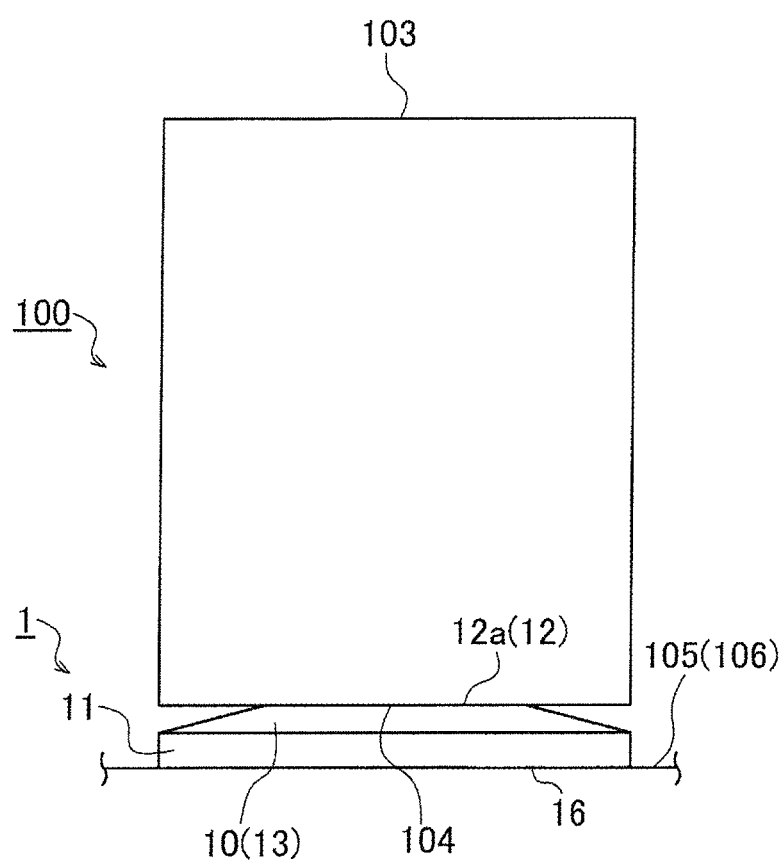
FIG. 5 is an explanatory view showing that the raw setter of the present invention is interposed between a honeycomb formed body and a shelf plate as seen from a side of the raw setter.

As shown in FIG. 5, the raw setter 1 has the chamfered portion 10, and hence, a part of the vicinity of a circumference of the formed body bottom surface 104 does not abut on the raw setter 1, and the honeycomb formed body 100 is loaded on the raw setter 1 in a state where the honeycomb formed body is raised from the raw setter 1 and the shelf plate 105. In this state, the honeycomb formed body is thrown into a firing furnace, and the firing step is performed. In consequence, the firing of the honeycomb formed body 100 is completed, and a honeycomb structure (not shown) is formed. In the firing step, the flat portion 12a of the raw setter 1 is smaller than the formed body bottom surface 104 of the honeycomb formed body 100, and the chamfered portion 10 having the tapered cross section is formed in the vicinity of the flat portion 12a, so that the honeycomb formed body 100 slightly swings to the raw setter 1 even by a vibration due to an influence of a gas flow in the firing step or movement of a firing cart in the case of tunnel kiln firing. Such swing can alleviate restraint between the honeycomb formed body 100 and the raw setter 1.

In the honeycomb formed body 100, by sintering of a ceramic raw material in the above firing step, a firing shrinkage is generated along each of the longitudinal direction of the formed body cells 102 and a cross sectional direction orthogonal to the longitudinal direction of the formed body cells 102. The raw setter 1 of the present embodiment is made of the same material as the honeycomb formed body 100, and hence, the raw setter isotropically carries out a firing shrinkage along a longitudinal direction of the cells 15 (which corresponds to an upward-downward direction of a paper surface in FIG. 2) and a cross sectional direction orthogonal to the longitudinal direction of the cells 15 (which corresponds to a right-left direction of the paper surface in FIG. 2) at about the same timing and about the same ratio as in the firing shrinkage of the honeycomb formed body 100. As a result, there lowers the possibility that the restraint occurs between the raw setter 1 and the honeycomb formed body 100 due to the firing shrinkage. Consequently, in the formed body bottom surface 104 of the honeycomb formed body 100, a defect due to deformation or fissures of the cell partition walls 14, a roundness defect or the like is not generated. As a result, it is possible to stably manufacture the honeycomb structure in which the problem of the defect or the like in the firing step can be eliminated and a quality of a product shape or the like is regulated.

In particular, the raw setter 1 of the present embodiment includes the chamfered portion 10, and hence, the flat portion area B of the flat portion 12a which comes in contact with the formed body bottom surface 104 of the honeycomb formed body 100 decreases. Furthermore, a circumference vicinity portion of the formed body bottom surface 104 of the honeycomb formed body 100 does not directly come in contact with the raw setter 1, and is raised from the shelf plate surface 106. As a result, the honeycomb formed body 100 is hardly influenced from the outside due to the contact with the raw setter 1 or the like, and can isotropically carry out the firing shrinkage. Therefore, it is possible to obtain the raw setter 1 so that the contact between the raw setter 1 and the honeycomb formed body which adversely affects the firing shrinkage in the firing step can be removed as much as possible.

Further, in the raw setter 1, the flatness in each of surfaces of the flat portion 12a of the one end face 12 and the flat portion 16a of the other end face 16 is set to 0.3 mm or less. Therefore, even when the formed body bottom surface 104 of the honeycomb formed body 100 comes in contact with the raw setter 1, a resistance between the formed body bottom surface 104 and the flat portion 12a can be decreased as much as possible by the flat portion 12a formed by a smooth flat surface having a flatness of 0.3 mm or less. Therefore, it is possible to eliminate the disadvantage that a part of the formed body bottom surface 104 is stuck on the flat portion 12a during the firing shrinkage, or the like, and the firing shrinkage is not disturbed (restrained).

The flatness of the flat portion 16a of the other end face 16 is set to 0.3 mm or less in the same manner as in the flat portion 12a of the one end face 12, and hence, a resistance between the shelf plate surface 106 of the shelf plate 105 and the flat portion 16a can be decreased. Here, as described above, the shelf plate 105 does not carry out the firing shrinkage in the firing step. On the other hand, the raw setter 1 carries out the firing shrinkage similarly to the honeycomb formed body 100. Therefore, in the firing step, a shrinkage difference is made between the raw setter 1 and the shelf plate 105. At this time, when the flatness of the flat portion 16a is larger than 0.3 mm, i.e., when the flat portion 16a has a large concave/convex portion, there heightens the possibility that the flat portion 16a is locally stuck on the shelf plate 105 and a free shrinkage is restrained when the raw setter 1 carries out the firing shrinkage. In consequence, the raw setter 1 is inhibited from isotropically carrying out the firing shrinkage, and the raw setter 1 might be deformed. As a result, there is the possibility that a difference is made in firing shrinkage between the honeycomb formed body 100 of a firing object and the raw setter 1. Therefore, the flatness of the flat portion 16a is set to 0.3 mm or less, so that the above disadvantage can be prevented in advance.

It is to be noted that the abovementioned flatness of the flat portion 12a of the one end face 12 is a difference between a maximum value and a minimum value which is disposing the flat portion 16a of the other end face 16 of the raw setter 1 as a lower surface on a flat plate and measuring a height of the flat portion 12a to the flat plate in a vertical direction to the flat plate. The flatness of the flat portion 16a of the other end face 16 is a difference between a maximum value and a minimum value which is disposing the flat portion 12a of the one end face 12 of the raw setter 1 as a lower surface on a flat plate and measuring a height of the flat portion 16a to the flat plate in a vertical direction to the flat plate. It is considered that a portion having a height larger than the maximum value of the height of the flat portion 16a is not present in the other end face 16, and hence, when a region (a burr or the like) in excess of the maximum value of the height of the flat portion 16a is generated during the preparation of the raw setter 1, processing is performed to remove the region.

Figure 8:
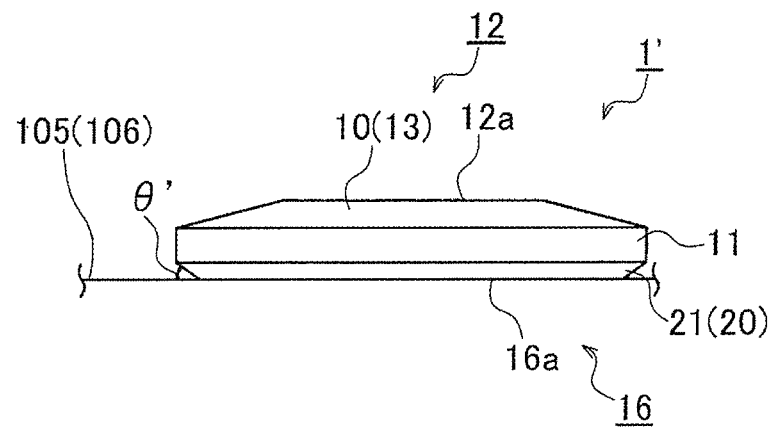
FIG. 8 is a front view showing a constitution of another example of the raw setter of the present invention.

As another example of the constitution of the present invention, FIG. 8 shows a raw setter 1' having a shown constitution. Here, for the purpose of simplifying explanation, in FIG. 8, components of the raw setter 1' of the present embodiment having the same constitution are denoted with the same reference numerals, and detailed description is omitted.

As shown in FIG. 8, the raw setter 1' of the other example of the constitution further has a chamfered portion 20 chamfering the vicinity of a circumferential side surface 11 of the other end face 16 in an oblique direction. The chamfered portion 20 can be formed by using a technique similar to that of the chamfered portion 10. The raw setter 1' of the above constitution is used in firing a honeycomb formed body 100, whereby an area of a flat portion 16a of the other end face 16 of the raw setter 1' which comes in contact with a shelf plate 105 can be decreased. As a result, a resistance to be generated between the shelf plate 105 and the raw setter 1' can be decreased. Here, an angle θ' formed between the flat portion 16a and an inclined wall surface 21 of the chamfered portion 20 can be set to a range of 3 to 50° in the same manner as in the angle θ formed between the flat portion 12a and the inclined wall surface 13 of the chamfered portion 10 described above. As described above, in a firing step, the honeycomb formed body 100 is fired in a state where the honeycomb formed body is loaded on the raw setter 1'. Therefore, the honeycomb formed body 100 easily swings due to the raw setter 1' of the other example of the constitution during the firing, and there heightens the effect that restraint of a firing shrinkage is alleviated by such swing.

Figure 9:
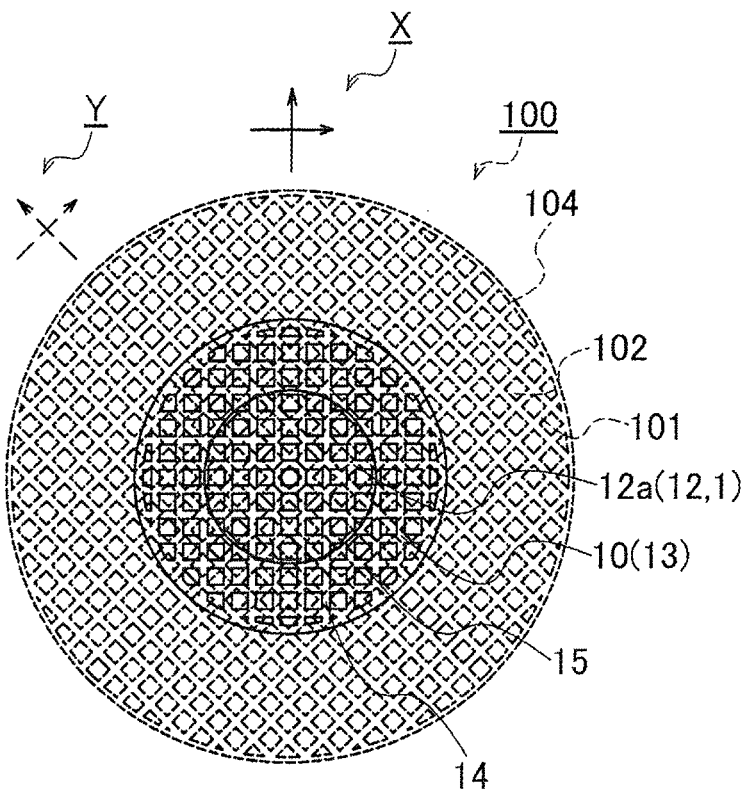
FIG. 9 is an explanatory view schematically showing one example of a lattice angle of formed body cells of the honeycomb formed body to the raw setter.
Figure 10:
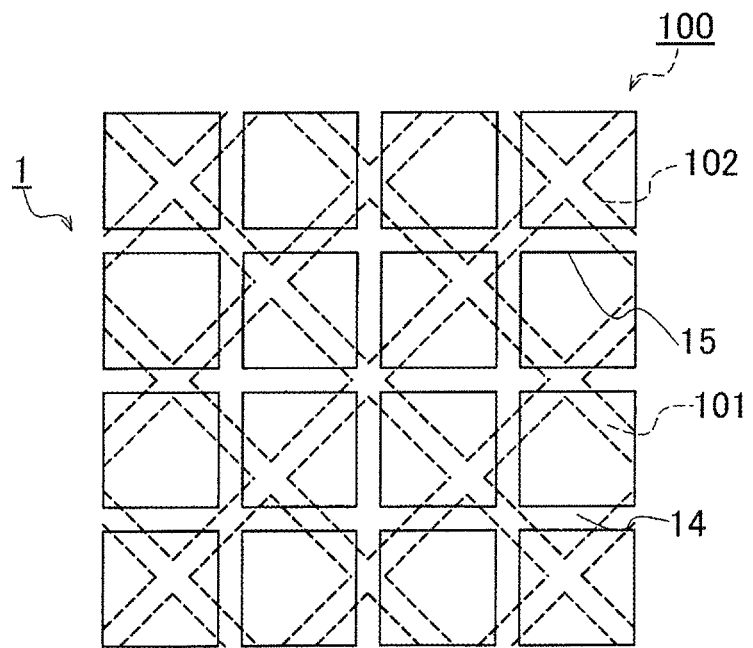
FIG. 10 is an enlarged explanatory view schematically showing one example of the lattice angle of the formed body cells of the honeycomb formed body to the raw setter.

Furthermore, when the honeycomb formed body 100 is loaded on the raw setter 1 or 1' of the present invention, a lattice direction Y of the cell partition walls 101 of the honeycomb formed body 100 does not match a lattice direction X of the cell partition walls 14 of the raw setter 1 or 1' as shown in FIG. 9 and FIG. 10. Here, the honeycomb formed body is preferably shifted and mounted so that the lattice direction Y of the cell partition walls 101 is displaced from the lattice direction X of the cell partition walls 14 in a range of 45±15°. When the lattice direction of the cell partition walls 14 matches that of the cell partition walls 101, there increase portions where the honeycomb formed body 100 carries out the firing shrinkage and is stuck on the raw setter 1 or 1'. Therefore, as described above, the lattice directions X and Y are displaced from each other so that the directions do not match each other, whereby it is possible to suppress the possibility that the restraint of the firing shrinkage occurs.

Even when the one end face 12 and the other end face 16 are replaced with each other in the raw setter 1 or 1', a similar effect can be expected. That is, even when the flat portion 12a of the one end face 12 is allowed to abut on the shelf plate surface 106 and the flat portion 16a of the other end face 16 is allowed to abut on the formed body bottom surface 104 of the honeycomb formed body 100, there can be expected the same effect as in the case that the flat portion 12a of the one end face 12 is allowed to abut on the formed body bottom surface 104 of the honeycomb formed body 100 and the flat portion of the other end face 16 is allowed to abut on the shelf plate surface 106 as described above.

Hereinafter, the raw setter of the present invention and the firing method in which the raw setter is used will be described on the basis of the following examples, but the raw setter of the present invention and the firing method are not limited to these examples.

EXAMPLES (1) Preparation of Raw Setter

A plurality of raw setters were prepared so that an area ratio R (%) of a flat portion of an upper surface of each raw setter to a formed body bottom area and an angle θ between a bottom surface of a formed body and an inclined wall surface of each chamfered portion matched the above ranges, respectively (Examples 1 to 10). Furthermore, raw setters (Comparative Examples 1 to 7) in each of which at least one of the above parameters departed from the above conditions and a pressed setter (Comparative Example 8) which has heretofore been used were prepared for comparison. Additionally, as described above, each raw setter was formed by using the same forming material as in a honeycomb formed body, extruding this material from an extruder in a horizontal direction, cutting the material into a predetermined length and cutting an upper chamfered portion at a predetermined angle. Dimensions of the raw setter were a diameter of 140 mm and a thickness of 20 mm. For the pressed setter, a diameter was set to 115 mm and a thickness was set to 8 mm. Additionally, as conditions other than the above parameters, the respective examples and comparative examples had the same conditions. Additionally, in Examples 1 to 9 and Comparative Examples 1 to 7, a lower chamfered portion was not disposed in the vicinity of a lower side. In Example 10, a lower surface of Example 3 was formed into the same tapered shape as in an upper surface. In addition, a flatness of each of the flat portion of the upper surface and a flat portion of the lower surface of the raw setter is set to 0.2 mm except in Comparative Example 7, and a flatness of Comparative Example 7 is set to 0.4 mm. A thickness of cell partition walls is set to 0.064 mm (2.5 mil), and a cell density is set to 93 cells/cm$^2$ (600 cpsi).

(2) Mounting of Honeycomb Formed Body

There was evaluated a difference between a case where a lattice direction of cell partition walls was matched with a lattice direction of the cell partition walls of the raw setter ("0°" in Table 1) (Examples 1 to 8 and 10) and a case where the lattice directions were displaced from each other as much as 45° ("45°" in Table 1) (Example 9), when the honeycomb formed body was mounted on each raw setter prepared in the above (1). In the honeycomb formed body, a diameter is set to 140 mm, a height is set to 120 mm, a thickness is set to 0.064 mm (2.5 mil), and a cell density is set to 93 cells/cm$^2$ (600 cpsi). Dimensions of a fired honeycomb structure are a diameter of 132 mm and a height of 114 mm. It is to be noted that the above thicknesses of the raw setter and honeycomb formed body and the cell density are values after the firing is performed.

(3) Firing Step

The prepared raw setter was mounted on a shelf plate surface of a shelf plate made of ceramics, and the honeycomb formed body was further mounted so that a formed body bottom surface of the honeycomb formed body abutted on an upper surface flat portion of the raw setter. Here, the honeycomb formed body was mounted so that a central position of the formed body bottom surface of the honeycomb formed body substantially matched a central position of the upper surface flat portion of the raw setter. The honeycomb formed body in the above state was thrown together with the shelf plate and the raw setter into a firing furnace. Additionally, as to firing conditions such as a firing time and a firing temperature, the same conditions were set in Examples 1 to 10 and Comparative Examples 1 to 8. The honeycomb structure is loaded such that a firing step and the fired setter were evaluated concerning the following items.

(4) Evaluation Item (Deformation of Cell Partition Walls)

A shape of a bottom surface (an end face) of the fired honeycomb structure was visually confirmed, and presence/absence of deformation of cell partition walls of the honeycomb structure was visually judged during a firing shrinkage. Additionally, for judgment criteria of the deformation of the cell partition walls, a case where the deformation of the partition walls was not recognized was defined as a suitable state "A", a case where the partition walls were slightly deformed was defined as an allowable state "B", and a case where large deformation was recognized and was outside the allowable state was defined as "C", whereby evaluations of three stages were performed. According to such an evaluation item, a correlation between the raw setter of the present invention and the deformation of the cell partition walls can be grasped.

(5) Evaluation Item (Roundness of Bottom Surface of Honeycomb Structure)

A roundness in the bottom surface of the honeycomb structure was evaluated. The roundness indicates a size of a difference (deviation) from a geometric circle of a circular form, and is represented by a difference between a maximum diameter and a minimum diameter. Here, the maximum diameter and the minimum diameter in the bottom surface of the honeycomb structure are measured with calipers, and a value of the roundness is calculated. For judgment criteria of the roundness, a roundness value of 0.58 or less was defined as "A", a range of 0.59 to 0.60 was defined as "B", and a value of 0.61 or more was defined as "C", whereby evaluations of three stages were performed. According to this evaluation item, it can be confirmed whether or not a part of the honeycomb formed body was restrained during the firing shrinkage and an isotropic shrinkage was not carried out.

(6) Evaluation Item (Change Amount of Roundness Before and after Firing)

The roundness of each of the formed body bottom surface of the honeycomb formed body before fired and the bottom surface of the fired honeycomb structure was calculated, and a difference between the roundness of the bottom surface of the honeycomb structure before fired and the roundness of the bottom surface of the fired honeycomb structure was evaluated. Additionally, a roundness difference value of 0.04 or less was defined as "A", a range of 0.05 to 0.06 was defined as "B", and a value of 0.07 or more was defined as "C", whereby evaluations of three stages were performed. According to this evaluation item, on the basis of the difference between the roundness values before and after the firing, it can be confirmed whether or not a part of the honeycomb formed body was restrained during the firing shrinkage and the isotropic shrinkage was not carried out.

(7) Evaluation Item (Fissures of Cell Partition Walls and Dent of Bottom Surface)

The bottom surface of the fired honeycomb structure was visually confirmed, and presence/absence of a defect such as "fissures" of the cell partition walls or "a dent" was judged in the firing step. Additionally, for these judgment criteria, a case where the fissures or the dent was not recognized was defined as "A", a case where the fissures or the dent was slightly present, but was in an allowable range was defined as "B", and a case where a large fissures or a lot of fissures or a deep dent was recognized and was outside the allowable range was defined as "C", whereby evaluations of three stages were performed. In consequence, it is possible to grasp a correlation between a quality/shape of the honeycomb structure actually obtained through the firing step and the raw setter of the present invention.

The honeycomb formed bodies were fired by using the raw setters and the pressed setter of Examples 1 to 10 and Comparative Examples 1 to 8, and a summary of the evaluation items to the fired setters and fired honeycomb structures is shown in Table 1 as follows.

TABLE 1

| | Parameters of raw setter and mounting | | | | Lattice | Evaluation Items | | | | |
|---|---|---|---|---|---|---|---|---|---|---|
| | Material | Area ratio R % | Angle θ | Flat-ness | direction of cell partition wall | Partition wall deformation | Bottom surface roundness | Bottom surface roundness change (before firing→after firing) | | Partition wall fissure | Bottom surface dent |
| Example 1 | Raw setter | 70 | 45° | 0.2 mm | 0° | A | 0.58 A | 0.05 | B | A | A |
| Example 2 | | 50 | 3° | 0.2 mm | 0° | A | 0.58 A | 0.02 | A | A | A |
| Example 3 | | 15 | 3° | 0.2 mm | 0° | A | 0.53 A | −0.03 | A | A | A |
| Example 4 | | 85 | 40° | 0.2 mm | 0° | A | 0.60 B | 0.06 | B | A | A |
| Example 5 | | 85 | 3° | 0.2 mm | 0° | A | 0.59 B | 0.05 | B | A | A |
| Example 6 | | 70 | 50° | 0.2 mm | 0° | A | 0.60 B | 0.06 | B | A | A |
| Example 7 | | 70 | 3° | 0.2 mm | 0° | A | 0.60 B | 0.06 | B | A | A |
| Example 8 | | 10 | 3° | 0.2 mm | 0° | A | 0.59 B | 0.06 | B | A | B |
| Example 9 | | 85 | 50° | 0.2 mm | 45° | A | 0.52 A | −0.07 | A | A | A |
| Example 10 | | 15* | 3°* | 0.2 mm | 0° | A | 0.47 A | 0.03 | A | A | A |
| Comparative Example 1 | | 100 | — | 0.2 mm | 0° | B | 0.62 C | 0.11 | C | C | C |
| Comparative Example 2 | | 85 | — | 0.2 mm | 0° | B | 0.68 C | 0.10 | C | A | A |
| Comparative Example 3 | | 85 | 50° | 0.2 mm | 0° | A | 0.67 C | 0.09 | C | A | A |
| Comparative Example 4 | | 85 | 45° | 0.2 mm | 0° | A | 0.63 C | 0.07 | C | A | A |
| Comparative Example 5 | | 10 | 50° | 0.2 mm | 0° | A | 0.63 C | 0.07 | C | A | B |
| Comparative Example 6 | | 5 | 3° | 0.2 mm | 0° | A | 0.67 C | 0.05 | B | A | C |
| Comparative Example 7 | | 85 | 40° | 0.4 mm | 0° | A | 0.62 C | 0.08 | C | A | A |
| Comparative Example 8 | Pressed setter | — | — | — | — | C | 0.56 A | 0.04 | C | A | A |

NOTE:
*The same tapered portion was also disposed on a back surface (a shelf plate side).

Consideration: Examples 1 to 10

When respective parameters of an area ratio R and an angle θ were in ranges defined in the raw setter of the present invention as shown in Table 1, a suitable evaluation was obtained in any one of evaluation items of the deformation of the cell partition walls, the roundness of the honeycomb structure bottom surface, the difference between the roundness values of the bottom surface of the honeycomb structure before and after the firing, the fissures of the cell partition walls and the dent (Examples 1 to 10). In consequence, it has been confirmed that the honeycomb formed body mounted on the raw setter of the present invention can perform the isotropic firing shrinkage in the firing step and that restraint due to the firing shrinkage does not occur between the formed body bottom surface of the honeycomb formed body and the raw setter and between the raw setter and the shelf plate. In particular, when the ratio of the contact area was set to a range of 15 to 70% and the angle θ was set to a range of 3 to 45°, a high evaluation could be obtained in any one of the evaluation items (Examples 1 to 3).

On the other hand, when the honeycomb formed body was fired by using the raw setter set so that the area ratio R was an upper limit value (=85%) of a defined range (Examples 4 and 5), slightly low evaluations were only obtained in the roundness of the honeycomb structure bottom surface and the difference between the roundness values of the bottom surface of the honeycomb structure before and after the firing. It is supposed that, when the area ratio R increases, the formed body bottom surface of the honeycomb formed body is easily restrained during the firing shrinkage and the above value of the roundness of the honeycomb structure bottom surface is influenced. Furthermore, when the angle θ was an upper limit value (=50°) of the defined range (Example 6) and when the angle was a lower limit value (=3°) of the defined range (Example 7), slightly low evaluations were obtained in the roundness of the bottom surface of the honeycomb structure and the difference between the roundness values of the bottom surface of the honeycomb structure before and after the firing. It is considered that the honeycomb formed body excessively noticeably swung during movement in the firing step or the swing could hardly be obtained, and hence, such results were obtained. Furthermore, when the area ratio R was a lower limit value (=10%) of the defined range, the dent was confirmed in the bottom surface together with the roundness of the bottom surface of the honeycomb structure and the difference between the roundness values of the bottom surface of the honeycomb structure before and after the firing. It is considered that when the area ratio R decreases, it is necessary to support the honeycomb formed body by the small flat portion, and a load of the honeycomb formed body is concentrated on the support portion, and hence, the dent was supposed to be generated. It is to be noted that in Example 4 to Example 8, the evaluation slightly lowers, but the result of each example is in an allowable range.

On the other hand, in an example where the lattice direction of the cell partition walls of the honeycomb formed body was displaced from the lattice direction of the cell partition walls of the raw setter as much as 45° (Example 9), a suitable result could be obtained in any one of the evaluation items, though the area ratio R was the upper limit value (=85%). That is, when the lattice direction is changed, the honeycomb formed body is stuck less on the raw setter, and a restraint in the firing shrinkage is hard to occur. Therefore, the effectiveness that the lattice direction is displaced to mount the honeycomb formed body is shown.

In Example 10, a taper was also disposed on the surface of the raw setter facing the shelf plate, and both surfaces of the raw setter had a tapered shape similar to that of a tapered surface of Example 3. As compared with Example 3, the roundness of the honeycomb structure bottom surface improves, and there is seen the effect that an interference between the shelf plate surface and the raw setter is alleviated.

Consideration: Comparative Examples 1 to 8

On the other hand, in the case of a raw setter (Comparative Example 1) in which an area ratio R was 100%, i.e., in the case of the conventional raw setter in which a constitution of a chamfered portion was not disposed in the raw setter of the present invention, the evaluation "C" or "B" was shown in the evaluation items other than the dent. Furthermore, in the case of a raw setter (Comparative Example 2) which had an area ratio R of 85% and did not have a chamfered portion and whose cross section had a staircase shape, the evaluation of "C" or "B" was shown in evaluation items other than the fissures of the cell partition walls and the dent.

Additionally, in a case where the area ratio R was the upper limit value (=85%) of the defined range and the angle θ was also the upper limit value (=50°) of the defined range or the vicinity (=45°) of the upper limit value (Comparative Examples 3 and 4) and a case where the area ratio R was the lower limit value (=10%) of the defined range (Comparative Example 5), the evaluation "C" was shown in the roundness of the bottom surface of the honeycomb structure and the difference between the roundness values of the bottom surface of the honeycomb structure before and after the firing. Particularly, in Comparative Example 5, a support area was small, and hence, the evaluation of the dent slightly lowered. Furthermore, in a case where the area ratio R was below the lower limit value of the defined range (Comparative Example 6), it was indicated that the dent especially enlarged. On the other hand, in the case of the conventional pressed setter (Comparative Example 8), the deformation of the cell partition walls was especially remarkably confirmed.

In Comparative Example 7, the flatness of the flat portion was set to 0.4 mm, and another raw setter shape was the same as in Example 4. As compared with Example 4, the roundness of the bottom surface of the honeycomb structure and the roundness change before and after the firing deteriorate. It has been confirmed that when the flatness is in excess of 0.3 mm, the restraint received from the flat portion of the raw setter by the honeycomb formed body bottom surface increases.

As described above in Examples 1 to 10 and Comparative Examples 1 to 8, the honeycomb formed body is fired by use of the raw setter prepared on conditions satisfying parameters so that the area ratio R is from 10 to 85%, further preferably from 10 to 70%, and especially preferably from 15 to 50%, and the angle θ is from 3 to 50°, further preferably from 3 to 45°, and especially preferably from 3 to 15° or less, whereby it is possible to manufacture the honeycomb structure in which the cell partition walls are not deformed, the roundness is high, and the fissures of the cell partition walls or the dent of the end face is not present.

A raw setter of the present invention and a firing method of a honeycomb formed body can be used in manufacturing a honeycomb structure which can be utilized in a car exhaust gas purifying catalyst carrier, a diesel particulate removing filter, a heat accumulating body for a burning device, or the like.

DESCRIPTION OF REFERENCE NUMERALS 1 and 1': raw setter
10: chamfered portion of one end face
11: circumferential side surface (circumferential portion)
12: one end face
12a: flat portion of the one end face
13 and 21: inclined wall surface
14: cell partition wall
15: cell
16: the other end face
16a: flat portion of the other end face
20: chamfered portion of the other end face
100: honeycomb formed body
101: cell partition wall
102: formed body cell
103: formed body upper surface 104: formed body bottom surface
105: shelf plate
106: shelf plate surface
T: thickness
θ and θ': angle formed between the flat portion and the chamfered portion
A: sectional area
B: flat portion area

What is claimed is:

1. A raw setter, which is used for firing a honeycomb formed body, comprising a plurality of polygonal cells defined by lattice-shaped cell partition walls extending from one end face, on which the honeycomb formed body is placed to an other end face, is made of the same material as the honeycomb formed body, has a first chamfered portion in which a circumferential portion of the one end face is chamfered in an oblique direction, has a tapered cross-sectional shape reducing a diameter of the one end face to an outer diameter, and has a second chamfered portion in which a circumferential portion of the other end face is chamfered in an oblique direction and has a tapered cross-sectional shape reducing a diameter of the other end face to a second outer diameter,
   wherein an area ratio R of a flat portion excluding the chamfered portion from the one end face to a cross-section perpendicular to the longitudinal direction of the polygonal cells that comprises the largest diameter of the raw setter is from 10 to 85%, an angle θ formed between the flat portion and the chamfered portion is from 3 to 50°, the other end face has a flat portion parallel to the flat portion of the one end face, a flatness of each of the flat portion of the one end face and the flat portion of the other end face is 0.3 mm or less, a thickness of the cell partition walls is 0.1 mm or less, and a circumferential portion of the raw setter has the same shape as a circumferential portion of the honeycomb formed body to be loaded.

2. The raw setter according to claim 1,
   wherein the angle θ formed between the flat portion and the chamfered portion is from 3 to 45°, and the area ratio R of the flat portion of the one end face to the cross section perpendicular to the longitudinal direction of the polygonal cells that comprises the largest diameter of the raw setter is from 10 to 70%.

3. The raw setter according to claim 1,
   wherein the area ratio R of the flat portion of the one end face to the cross section perpendicular to the longitudinal direction of the polygonal cells that comprises the largest diameter of the raw setter is from 15 to 50%.

4. The raw setter according to claim 1,
   wherein the angle θ formed between the flat portion and the chamfered portion is from 3 to 15°.

5. A firing method of a honeycomb formed body by using the raw setter according to claim 1,
   wherein the honeycomb formed body is loaded in an upright position on the raw setter arranged on a shelf plate, to perform the firing.

6. The firing method of the honeycomb formed body according to claim 5,
   wherein the raw setter comprises a plurality of same polygonal cells defined by the lattice-shaped cell partition walls as the honeycomb formed body.

7. The firing method of the honeycomb formed body according to claim 5,
   wherein the honeycomb formed body is loaded on the raw setter so that a lattice direction of cell partition walls of the honeycomb formed body does not match a lattice direction of the cell partition walls of the raw setter.

* * * * *